(12) United States Patent
Boren

(10) Patent No.: US 9,517,660 B1
(45) Date of Patent: Dec. 13, 2016

(54) STUDDED TIRE AND METHOD OF INCREASING TIRE TRACTION

(71) Applicant: The Boeing Company, Chicago, IL (US)

(72) Inventor: Kelly L. Boren, Marysville, WA (US)

(73) Assignee: The Boeing Company, Chicago, IL (US)

( * ) Notice: Subject to any disclaimer, the term of this patent is extended or adjusted under 35 U.S.C. 154(b) by 398 days.

(21) Appl. No.: 13/867,103

(22) Filed: Apr. 21, 2013

(51) Int. Cl.
*B60C 11/00* (2006.01)
*B60C 11/14* (2006.01)
*B64C 25/36* (2006.01)
*B60C 11/16* (2006.01)

(52) U.S. Cl.
CPC .............. *B60C 11/14* (2013.01); *B64C 25/36* (2013.01); *B60C 11/1643* (2013.04); *B60C 11/1687* (2013.04)

(58) Field of Classification Search
CPC ...... B60C 11/00; B60C 11/13; B60C 11/1307; B60C 11/1346; B60C 11/1353; B60C 11/14; B60C 11/16; B60C 11/1625; B60C 11/1643; B60C 11/1687
See application file for complete search history.

(56) References Cited

U.S. PATENT DOCUMENTS

| 6,119,744 A  * | 9/2000 | Tsukagoshi ......... B60C 11/0309 152/209.19 |
| 2011/0203709 A1* | 8/2011 | Behr et al. ............... 152/209.24 |

FOREIGN PATENT DOCUMENTS

| AT | 324141 | * | 8/1975 |
| DE | 2161261 | * | 6/1973 |
| EP | 227322 | * | 7/1987 |
| EP | 2127911 | * | 12/2009 |
| GB | 139649 | * | 3/1920 |
| JP | 2000-363916 | * | 12/2000 |
| JP | 2002-19420 | * | 1/2002 |

OTHER PUBLICATIONS

Machine translation of AT 324141, 1975.*
U.S. Appl. No. 13/556,211, entitled Controlled Landing Gear Tire Traction System, filed Jul. 24, 2012.

* cited by examiner

*Primary Examiner* — Justin Fischer

(57) ABSTRACT

A tire may include a tire body having an annular groove formed in a tread surface of the tire body. A plurality of spaced-apart studs may be located within the groove.

19 Claims, 15 Drawing Sheets

STUDDED TIRE AND METHOD OF INCREASING TIRE TRACTION

FIELD

The present disclosure relates generally to tires and, more particularly, to a studded tire as may be used on an aircraft or other vehicle.

BACKGROUND

Aircraft typically employ several mechanisms for reducing the speed of the aircraft during a landing roll-out. For example, thrust reversers on the engines may be deployed following touchdown to direct at least a portion of the normally aft-directed engine thrust into a forward direction. The forwardly-directed engine thrust may reduce the length of the landing roll-out wherein the aircraft may slow down to a speed wherein the aircraft may safely exit the runway before reaching the end of the runway.

Spoilers are another mechanism for slowing an aircraft. Spoilers may be deployed from an upper surface of the aircraft wings such as following touchdown to increase aerodynamic drag which may directly slow the aircraft. Spoilers may also indirectly slow the aircraft by disrupting air flowing over the wings which may cause a reduction in the amount of lift generated by the wings. The reduction in wing lift may result in a transfer of the aircraft weight from the wings to the landing gear which may increase the effectiveness of the landing gear braking system. In this regard, the increase in weight on the landing gear may result in an increase in friction between the landing gear wheels and the runway surface which may allow for increased braking force without the wheels skidding.

Occasionally, a runway may become contaminated. For example, in snowy climates, a runway may become contaminated with snow which may reduce traction between the landing gear wheels and the runway surface. The reduced traction may reduce the effectiveness of the landing gear braking system which may result in an increase in the distance required to slow the aircraft to a speed wherein the aircraft may safely exit the runway.

For automotive roadways, frictional material such as sand or gravel may be applied to a snow-covered or ice-covered roadway surface to increase friction with the tires of automobiles and trucks. Conventional studded tires or chains may also be mounted on automobiles and trucks operating on snow-covered roadways to increase traction. Unfortunately, sand or gravel cannot be applied to a runway surface due to the potential for damage to turbine engines upon ingesting such sand, gravel, or other foreign object debris (FOD) into the engine intake. Conventional studded tires and chains cannot be used on aircraft due to the potential for damage to runway surfaces including the potential for FOD that may be generated as a result of studs breaking off and being thrown from a tire under centrifugal force.

As can be seen, there exists a need in the art for a system and method for providing increased traction between a tire on a surface such as a runway surface contaminated with snow or other forms of contamination, and which does not damage a runway surface or generate FOD.

SUMMARY

The above-noted needs associated with tires on contaminated surfaces are specifically addressed and alleviated by the present disclosure which provides a tire which may include a tire body having an annular groove formed in a tread surface of the tire body. The tire may include a plurality of spaced-apart studs that may be located within the groove.

In a further embodiment, provided is an aircraft which may have a landing gear. The landing gear may include a wheel having a tire body mounted on the wheel. The tire body may have at least one annular groove formed in a tread surface of the tire body. A plurality of spaced-apart studs may be located within the groove Also disclosed is a method of increasing tire traction. The method may comprise supporting a vehicle on a tire having at least one annular groove formed in a tread surface. The method may further comprise including a plurality of spaced-apart studs within the groove. In addition, the method may comprise rolling the tire over a contamination layer covering a vehicle-supporting surface, and engaging the studs with the contamination layer as the tire rolls over the contamination layer. The method may additionally comprise increasing tire traction in response to the contamination layer engaging the studs.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
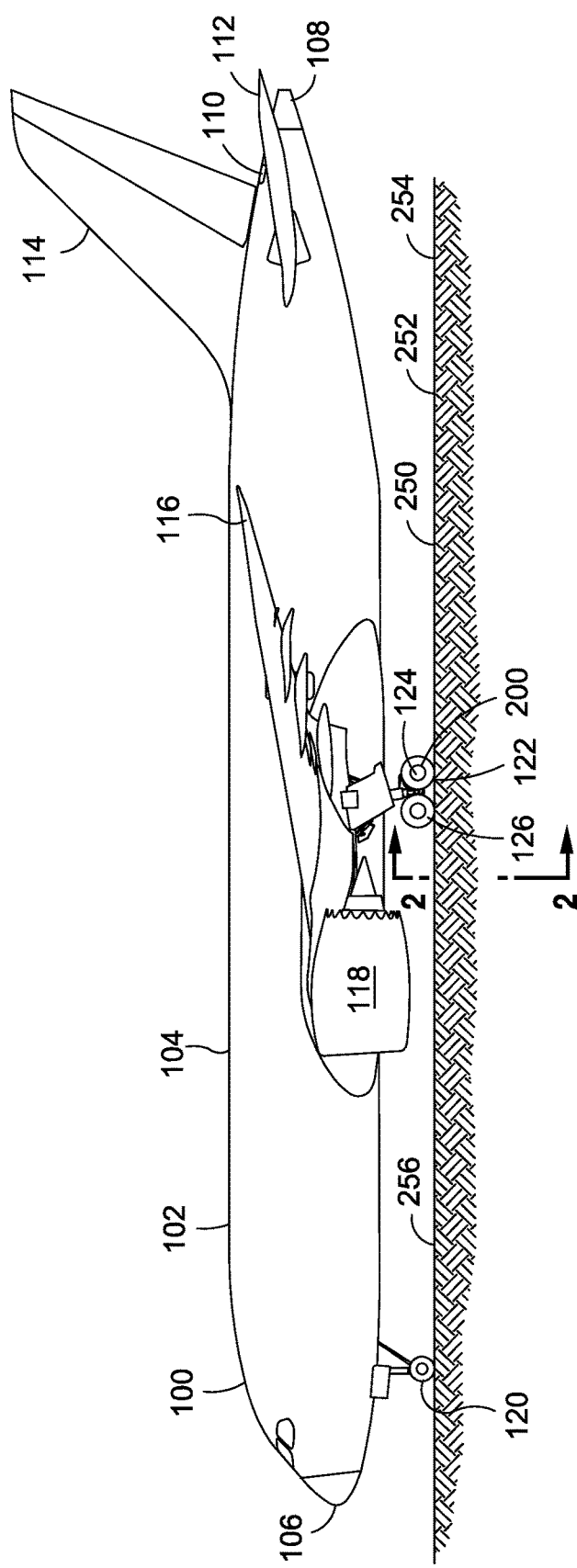
FIG. 1 is a side view of an aircraft having a nose landing gear and a main landing gear supporting the aircraft on a runway surface.

Referring now to the drawings wherein the showings are for purposes of illustrating various embodiments of the present disclosure, shown in FIG. 1 is an aircraft 102 having a fuselage 104 extending from a forward end 106 of the aircraft 102 to an aft end 108 of the aircraft 102. The aft end 108 may include an empennage 110 having one or more tail surfaces such as a horizontal tail 112 and/or a vertical tail 114 for directional control and stability of the aircraft 102. The aircraft 102 may further include a pair of wings 116 extending outwardly from the fuselage 104 and may include one or more propulsion units 118 that may be mounted to the wings 116. The aircraft 102 may be supported by landing gear on a vehicle-supporting surface 250 such as a runway, a taxiway, an airport tarmac, or other surface. In FIG. 1, the aircraft 102 is shown supported on a tricycle landing gear arrangement comprising a nose landing gear 120 and a pair of main landing gear 122.

Figure 2:
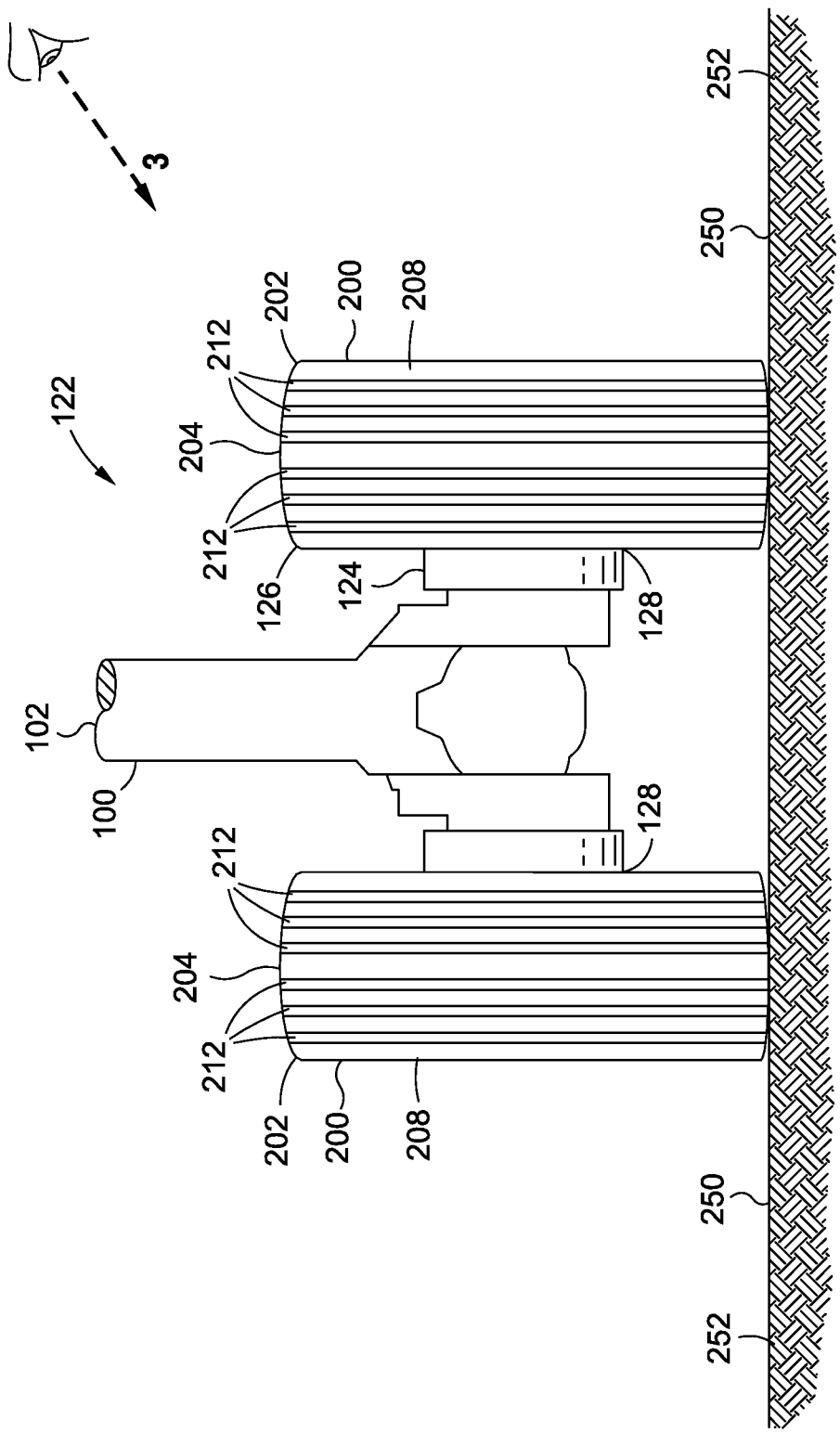
FIG. 2 is a front view of a main landing gear taken along line 2 of FIG. 1 and illustrating a pair of wheels each having tires including angular grooves.

FIG. 2 is a front view of an embodiment of a landing gear having wheels 126 mounted to an axle 124. Each one of the wheels 126 may include a rim 128 having a tire 200 mounted to the rim 128. The tire 200 may be a pneumatic tire 200 that may be inflated with air or gas to within a designated pressure range. However, the tire 200 may be a non-pneumatic tire. The tire 200 may be configured to support at least a portion of the weight of the aircraft 102. Advantageously, the tire 200 includes a plurality of studs 300 (FIG. 3) located within annular grooves 212 (FIG. 3) to increase the traction of the tire 200. For example, the plurality of studs 300 may increase the traction of the tire 200 on a contamination layer 254 such as a snow layer 256 that may be covering a runway surface 252. In this regard, as the tire 200 rolls over the contamination layer 254 such as a snow layer 256, a portion of the snow may enter the grooves 212 of the tire 200 and may engage the studs 300. The engagement of the snow layer 256 with the studs 300 may increase the traction of the tire 200.

Although the tire 200 embodiments in the present disclosure are described in the context of a commercial passenger aircraft such as the aircraft 102 illustrated in FIG. 1, the tire 200 may be mounted on the landing gear of any aircraft of any configuration, without limitation, including any civil, commercial, or military aircraft. In addition, the tire 200 embodiments may be mounted on aircraft having alternative landing gear arrangements other than the tricycle landing gear arrangement shown in FIG. 1. For example, any one of the tire 200 embodiments disclosed herein may be mounted on a tail-dragger landing gear arrangement. Further in this regard, any one of the tire 200 embodiments may be mounted on vehicles other than aircraft. For example, the tire 200 may be mounted on automotive vehicles including passenger vehicles such as vans and automobiles, and on other vehicles such as trucks, buses, and any other vehicle such as may be operated on a roadway.

In the context of an aircraft such as the passenger aircraft 102 illustrated in FIG. 1, the tire 200 embodiments disclosed herein may allow the aircraft 102 to operate in multiple climates or multiple weather conditions including in hot, dry conditions and in cold, wet, and/or snowy conditions. In this regard, the studs 300 in the grooves 212 of the tire 200 may advantageously increase the traction of the tire 200 in limited-traction scenarios by increasing the gripping capability of the tire 200. The studs 300 may improve traction and thereby improve braking performance during landing, taxing, parking, and other ground operations that may be conducted over a contaminated layer covering a vehicle-supporting surface 250 such as a runway surface 252, a taxiway, an apron, or other surfaces. The tire 200 embodiments may advantageously increase traction over a contaminated layer without damage to the vehicle-supporting surface 250 and without adversely affecting braking performance in dry conditions. Furthermore, the tire 200 embodiments disclosed herein may allow for operation of aircraft without requiring the deployment of thrust reversers, and/or may allow the operation of aircraft that lack thrust reversers.

Figure 3:
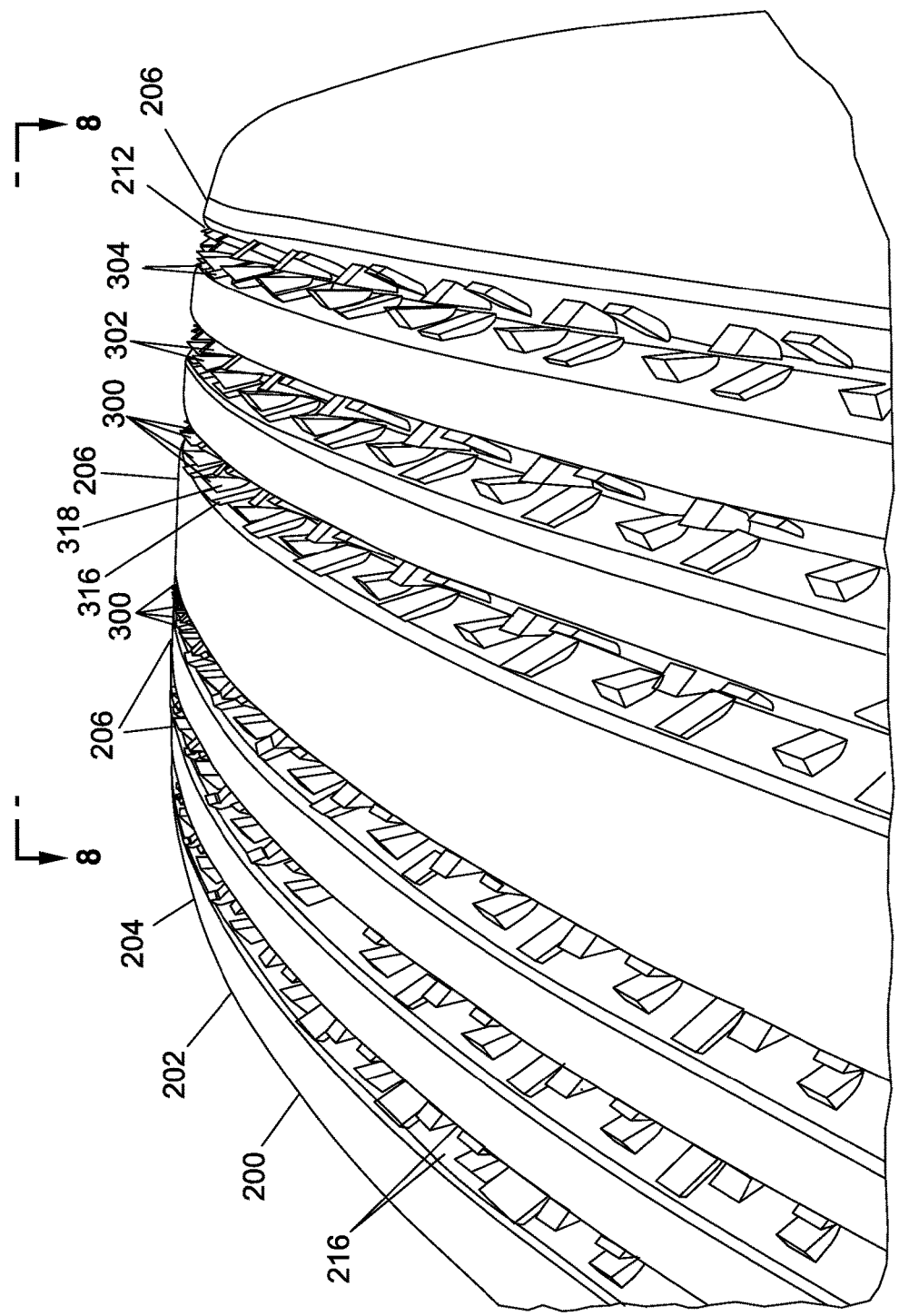
FIG. 3 is a perspective view of a portion of an embodiment of a tire taken along line 3 of FIG. 2 and illustrating a plurality of spaced apart studs located within the grooves.
Figure 5:
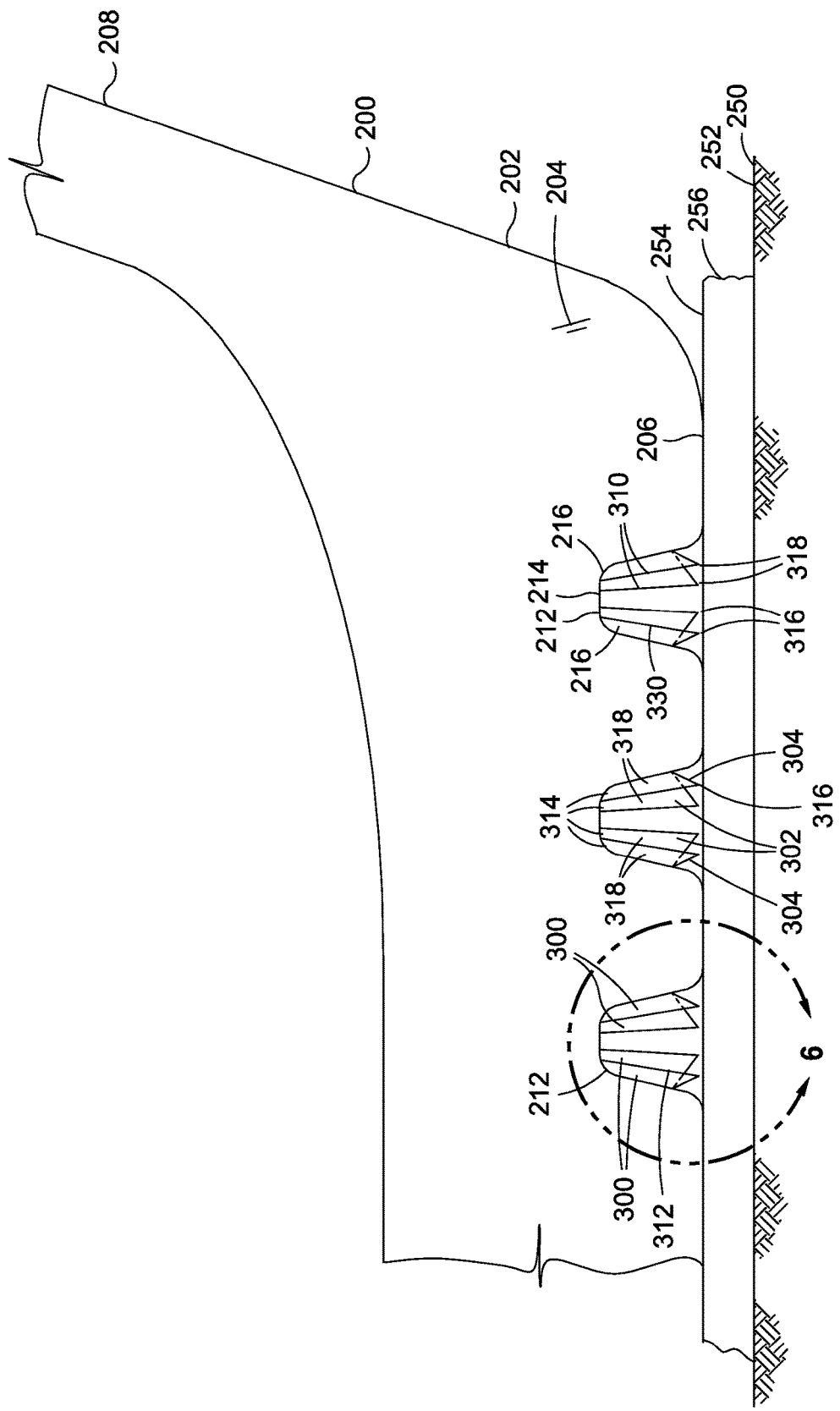
FIG. 5 is a cross-sectional view of a portion of the tire of FIG. 4 supported on a surface covered with a contamination layer.

Referring to FIG. 3, shown is a portion of a tire 200 having an outer circumferential tread band 204 which may be defined as the portion of the tire 200 that contacts the vehicle-supporting surface 250. The tread band 204 may extend between an opposing pair of tire side walls 208. Each one of the tire side walls 208 may include a tire bead 210 (FIG. 9) that may be mounted on the rim 128 (FIG. 9) of a wheel 126 (FIG. 9) in sealing engagement with the rim 128. The tread band 204 may include at least one annular groove 212 formed in the tread surface 206. In the embodiment shown, the tread band 204 includes six grooves 212 although any number of grooves 212 may be provided. Each groove 212 may have a groove bottom wall 214 (FIG. 5) and an opposing pair of groove side walls 216 (FIG. 5). However, the grooves 212 may be provided in any one of a variety of alternative configurations. For example, the grooves 212 may be provided in a generally U-shaped configuration (not shown).

In FIG. 3, one or more of the grooves 212 may include a plurality of spaced-apart studs 300. Each one of the studs 300 may have a stud base 314 and a stud tip 316. In an embodiment, the studs 300 may be arranged in spaced relation to one another along a circumferential direction 220 of the groove 212. In an embodiment, the stud tips 316 may be recessed below (i.e., located radially inboard of) the tread surface 206 as described in greater detail below. By terminating the stud tips 316 below or flush with the tread surface 206 such that the studs 300 are non-protruding beyond the tread surface 206, breaking off of the stud tips 316 may be prevented and which may eliminate the potential for the stud tips 316 being thrown free of the tire 200 and becoming foreign object debris (FOD) as may occur in conventional studded tires (not shown) having studs (not shown) that are separately inserted into the tire in a post-molding operation.

Figure 4:
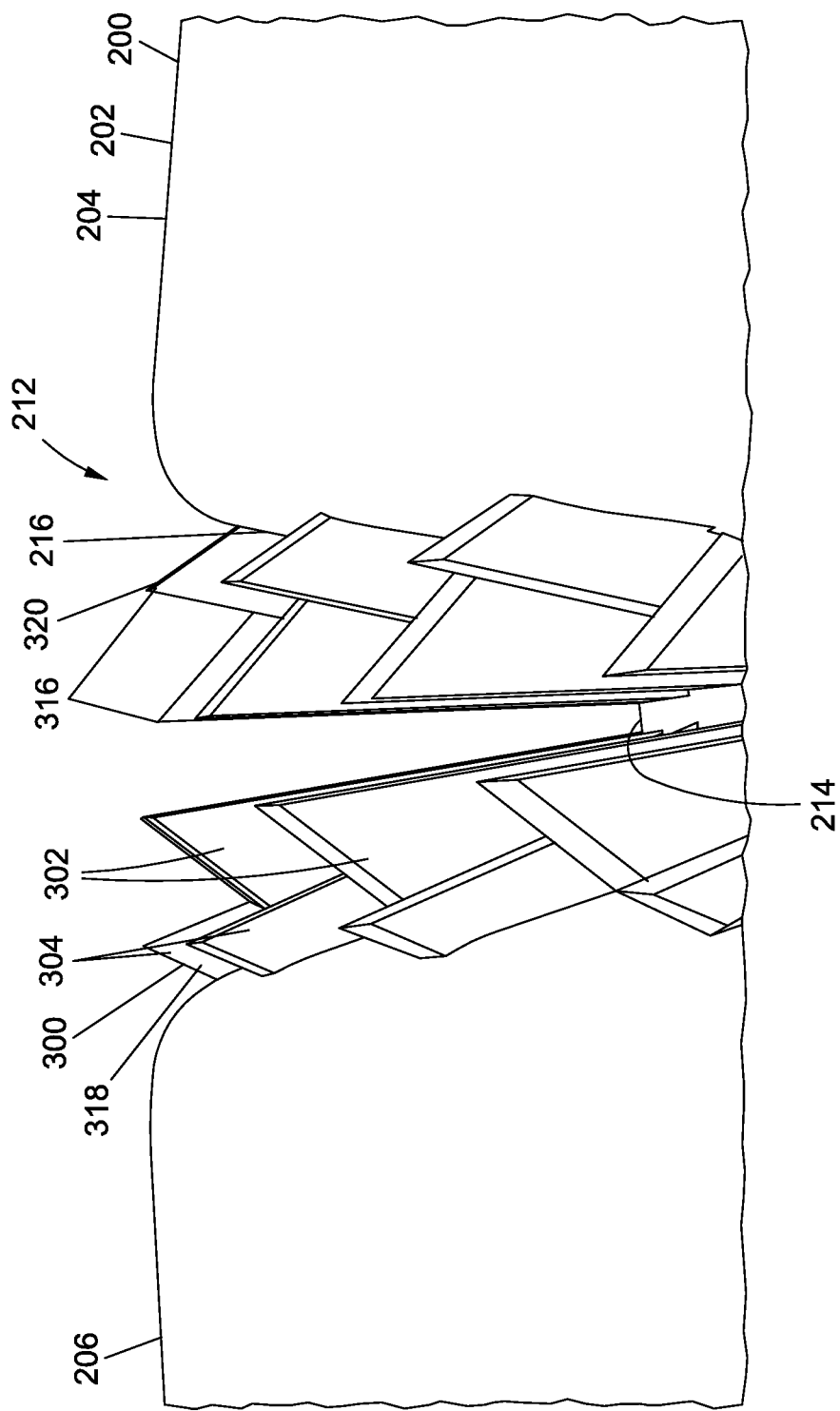
FIG. 4 is an end view of a groove and illustrating an embodiment including a plurality of major studs and a plurality of minor studs in one of the grooves.

FIG. 4 shows an end view of a groove 212 having a plurality of studs 300 located within the groove 212. In the embodiment shown, the studs 300 are shown having a bladed shape 318 with bladed tips 320. However, the studs 300 may be provided in any configuration as described in greater detail below. In addition, FIG. 4 illustrates an embodiment wherein the plurality of studs 300 are provided in two different configurations including a plurality of major studs 302 and a plurality of minor studs 304 and which are positioned in spaced relation to one another along a circumferential direction 220 of the grooves 212. The studs 300 may be attached to the tire 200 using any one of a variety of different means. For example, the studs 300 individually coupled to the tire 200 by mechanically fastening (not shown) and/or adhesively bonding (not shown) each stud 300 to the tire 200.

In FIG. 4, in an embodiment, the studs 300 may integral with the grooves 212. For example, the studs 300 may be integrally molded with the tire body 202. Advantageously, integrally molding the studs 300 with the tire body 202 may eliminate the potential for the studs 300 breaking off and being thrown from the tire 200 under centrifugal force and resulting in FOD. In an embodiment, the studs 300 may be formed of a rubber compound and may be integrally molded into the grooves 212 of the tread band 204 which may also be formed of a rubber compound. The rubber compound of the tread band 204 may be the same compound or a different compound than the rubber compound of the studs 300. In an embodiment, the rubber compound of the studs 300 may have a hardness or durometer that may be less than the durometer of the rubber compound of the tread band 204 or tire body 202. The stud 300 durometer may be higher (e.g., harder) than the tread band 204 durometer at temperatures below a threshold temperature, and the stud 300 durometer may be substantially equivalent to the tread band 204 durometer at temperatures above the threshold temperature. For example, the stud 300 durometer may be higher than the tread band 204 durometer at an air temperature on the ground of less than approximately 32 degrees F.

In a further embodiment, the rubber compound of the studs 300 may be such that the stud 300 durometer may be approximately equal to the tread band 204 durometer at an air temperature above 32 degrees F. on the ground. For a stud 300 durometer that is higher than the tread band 204 durometer at temperatures below a given threshold, the studs 300 may provide increased traction in cold temperatures where snow may be present on a runway. By retaining an equivalent stud 300 durometer and tread band 204 durometer at temperatures above the threshold temperature, the tire 200 may retain its braking performance in dry conditions.

In FIG. 5, the studs 300 may be configured to engage a contamination layer 254 that may cover a vehicle-supporting surface 250. As indicated above, the vehicle-supporting surface 250 may comprise any one of a variety of different surfaces. For example, in the context of an aircraft 102, the vehicle-supporting surface 250 may comprise surfaces that are common to an airport such as a surface of a runway, a taxiway, an apron, a ramp, or other surfaces. The vehicle-supporting surface 250 may also include non-traditional surfaces such as a gravel runway, an ice runway, or other runway or landing strip surfaces. The vehicle-supporting surface 250 may also comprise a road surface, a ground surface, or any other surface over which a tire 200 may roll for vehicles 100 other than aircraft 102.

In FIG. 5, two different configurations or shapes of studs 300 including major studs 302 and minor studs 304 are positioned in each one of the grooves 212. However, any number of different stud 300 configurations may be positioned in a given groove 212 including a single stud 300 configuration in a given groove 212, or two or more different stud 300 configurations in a given groove 212. The stud 300 size, shape, configuration, and stud spacing 328 within a given groove 212 may be selected to provide optimal traction characteristics for the type(s) of contamination layers 254 over which the tire 200 may operate. Furthermore, different grooves 212 in a tire 200 may have different stud 300 configurations. For example, grooves 212 located near the edges of the tread band 204 (FIG. 5) may include studs 300 that may have a different stud 300 configuration and/or stud spacing 328 than the stud 300 configuration and/or stud spacing 328 of studs 300 in the grooves 212 located toward a center (not shown) of the tread band 204 (FIG. 5).

Figure 6:
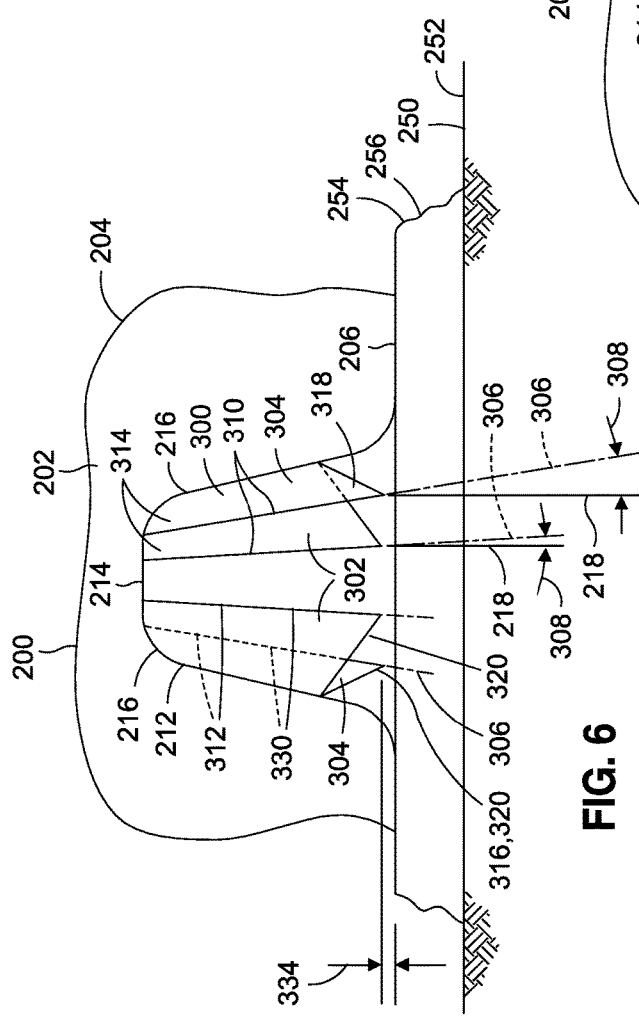
FIG. 6 is a sectional view of a portion of the tire taken along line 6 of FIG. 5 and illustrating the studs having stud tips that are recessed below a tread surface.

FIG. 6 shows the studs 300 extending radially outwardly from the groove bottom wall 214 and/or the groove side walls 216. As indicated above, each one of the studs 300 has a stud base 314 and a stud tip 316. The stud base 314 may be integrally formed or molded with the groove bottom wall 214 and a portion of a groove side wall 216. A portion of a stud side may be attached to or integrally formed or molded with one of the groove side walls 216. However, the stud base 314 may be attached to or integrally formed with the groove bottom wall 214 and the stud 300 may be unattached to a groove side wall 216. In the embodiment shown, the studs 300 may be positioned adjacent to the opposing groove side walls 216. However, in an embodiment not shown, the studs 300 may extend from only one of the groove side walls 216, or the studs 300 in a groove 212 may be biased toward one of the groove side walls 216.

In FIG. 6, the studs 300 may be arranged along a circumferential direction 220 of the groove 212 in a pattern of major studs 302 and minor studs 304 as indicated above, although the studs 300 may be provided in any one of a variety of other stud configurations, as indicated above. The studs 300 are shown as having a bladed shape 318 and may be provided in a stud spacing 328 that may promote the release of contamination such as snow, slush, and/or ice from the grooves 212 such as during rotation of the tire 200. The bladed shape 318 may include a bladed tip 320 and may have at least one generally planar stud side surface 310 extending along a length of the stud. For example, the bladed stud 300 may have a generally orthogonal cross-sectional shape such as a square cross-sectional shape or rectangular cross-sectional shape. However, the studs 300 may be provided in alternative cross-sectional shapes. In this regard, any one of the studs 300 may be provided with one or more stud side surfaces 310 having a non-planar shape. The stud side surfaces 310 may be oriented at a draft angle 312 relative to a radial direction 218 to facilitate removal of the tire 200 from a mold (not shown).

Referring still to FIG. 6, in the embodiment shown, the major studs 302 and the minor studs 304 may extend outwardly in a radial direction 218 such that the stud tips 316 of the major studs 302 and the minor studs 304 terminate at approximately the same radial location. However, the stud tips 316 of the major studs 302 may terminate at different radial locations than the stud tips 316 of the minor studs 304. The major studs 302 may laterally extend away from the groove side walls 216 at a lateral protrusion 330 that is greater than a lateral protrusion 330 of the minor studs 304. In the embodiment shown, the studs 300 may be oriented at different angles relative to one another. For example, each one of the studs 300 may have a stud axis 306. One or more of the stud axes 306 may be oriented in a non-radial direction 218 when the studs 300 are viewed along a circumferential direction 220 of a groove 212. Each one of the stud axes 306 may define a stud angle 308 relative to a radial direction 218 of the tire 200. In an embodiment, the stud angle 308 of at least two of the studs 300 may be different from one another when viewed along a circumferential direction 220 of the groove 212. However, although not shown, the studs 300 in any one of the grooves 212 may be oriented at the same stud angle 308 relative to the radial direction 218 when the groove 212 is viewed along a circumferential direction 220.

In FIG. 6, the tire 200 may be provided in an embodiment wherein the stud tips 316 may be recessed below the tread surface 206 which may eliminate the potential for the stud tips 316 breaking off and becoming foreign object debris (FOD) as may occur if the tire 200 frequently operates on dry surfaces. In an embodiment, the stud tips 316 may terminate at a tip recession 334 of no less than approximately 0.050 inch below the tread surface 206 in order to maximize the length of the studs 300 that may engage contamination such as snow entering the grooves 212. In a further embodiment, the stud tips 316 may be substantially level or flush with the tread surface 206. The location of the stud tips 316 relative to the tread surface 206 may be measured when the tire 200 is inflated to within a rated operating pressure range, and the tire 200 is supporting a mass substantially equivalent to a designated or normal operating weight range for the given tire 200.

Figure 7:
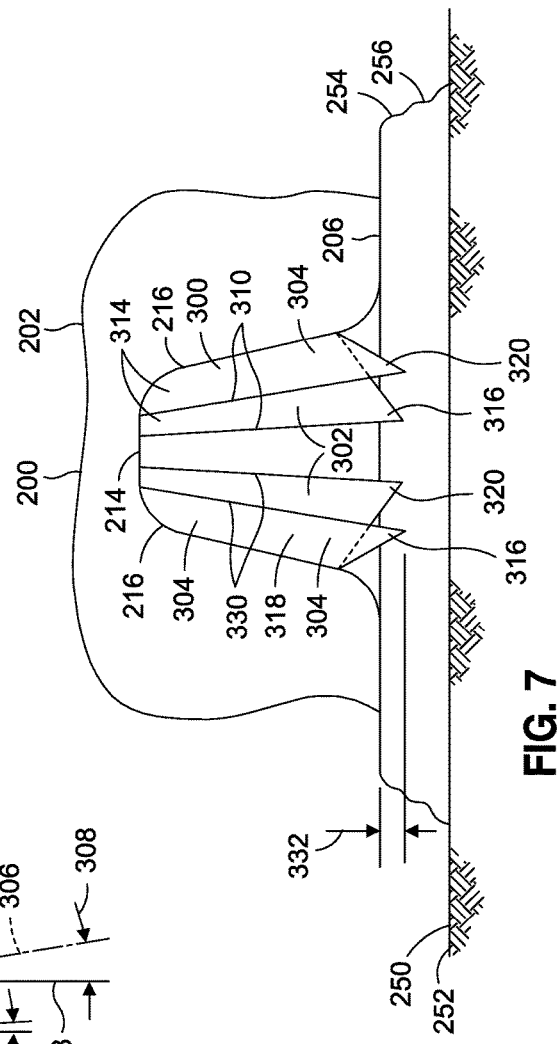
FIG. 7 is a sectional view of a further embodiment of the tire illustrating studs having stud tips protruding beyond the tread surface.

FIG. 7 shows an embodiment of the tire 200 wherein the studs 300 may be formed of a rubber compound and may protrude beyond the tread surface 206. In an embodiment, the stud tips 316 may protrude beyond the tread surface 206 by a tip protrusion 332 of from approximately 0.030 inch to approximately 0.10 inch or more. The stud tips 316 may protrude beyond the tread surface 206 by a tip protrusion 332 of less than approximately 0.030 inch which may allow the tire 200 to operate on a dry surface with minimal impact on dry surface braking performance. However, the studs 300 may be configured such that the stud tips 316 protrude beyond the tread surface 206 by a tip protrusion 332 of more than approximately 0.10 inch for situations wherein the aircraft 102 operates substantially exclusively in winter or snowy climates where runway surfaces 252 or other vehicle-supporting surfaces 250 are substantially constantly covered with a snow layer 256, a slush layer, and/or an ice layer.

Figure 8:
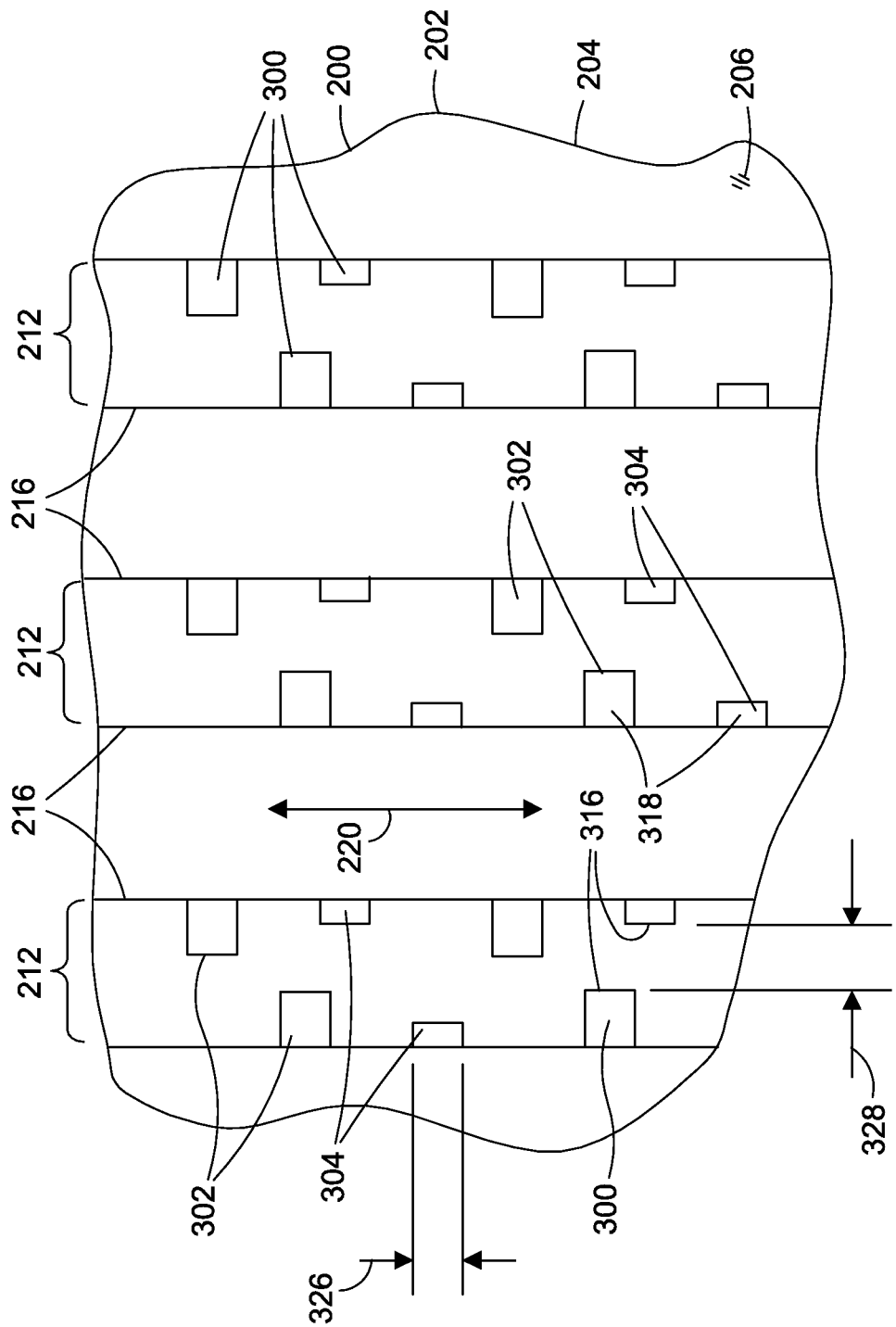
FIG. 8 is a top view of a portion of the tire taken along line 8 of FIG. 3 and illustrating the studs arranged in staggered relation to one another.

FIG. 8 is a top view of an embodiment of a tire 200 having a plurality of grooves 212 containing studs 300 configured in a bladed shape 318 and arranged in staggered relation to one another along a circumferential direction 220. In the embodiment shown, the studs 300 on one of the groove side walls 216 are staggered in relation to the studs 300 on the opposing one of the groove side walls 216. In each one of the grooves 212, the studs 300 are arranged in an alternating pattern of major studs 302 and minor studs 304 along each one of the groove side walls 216. In the embodiment shown, the studs 300 are spaced apart from one another at a stud spacing 328 of at least approximately one stud width 326, although the studs 300 may be provided in a stud spacing 328 of greater than one stud width 326. A stud width 326 may be defined as the width of the smallest stud 300 among a pattern of studs 300 in a groove 212.

Advantageously, by arranging the studs 300 in a stud spacing 328 of no less than approximately one stud width 326, snow, ice, mud, and/or other contamination or debris may be disbursed from the groove 212 wherein the debris may radially fly out of the groove 212 under centrifugal force as the tire 200 is rolling. As indicated above, the pattern of studs 300 in one groove 212 may be different than the pattern of studs 300 in another groove 212 of the same tire 200. As is also indicated above, the studs 300 may be provided in configurations other than the major studs 302 and the minor studs 304 shown in the figures. For example, one or more of the grooves 212 may contain studs 300 having identical configurations. Alternatively, one or more of the grooves 212 may contain studs 300 having a plurality of different stud 300 configurations such as more than two different stud 300 configurations.

Figure 9:
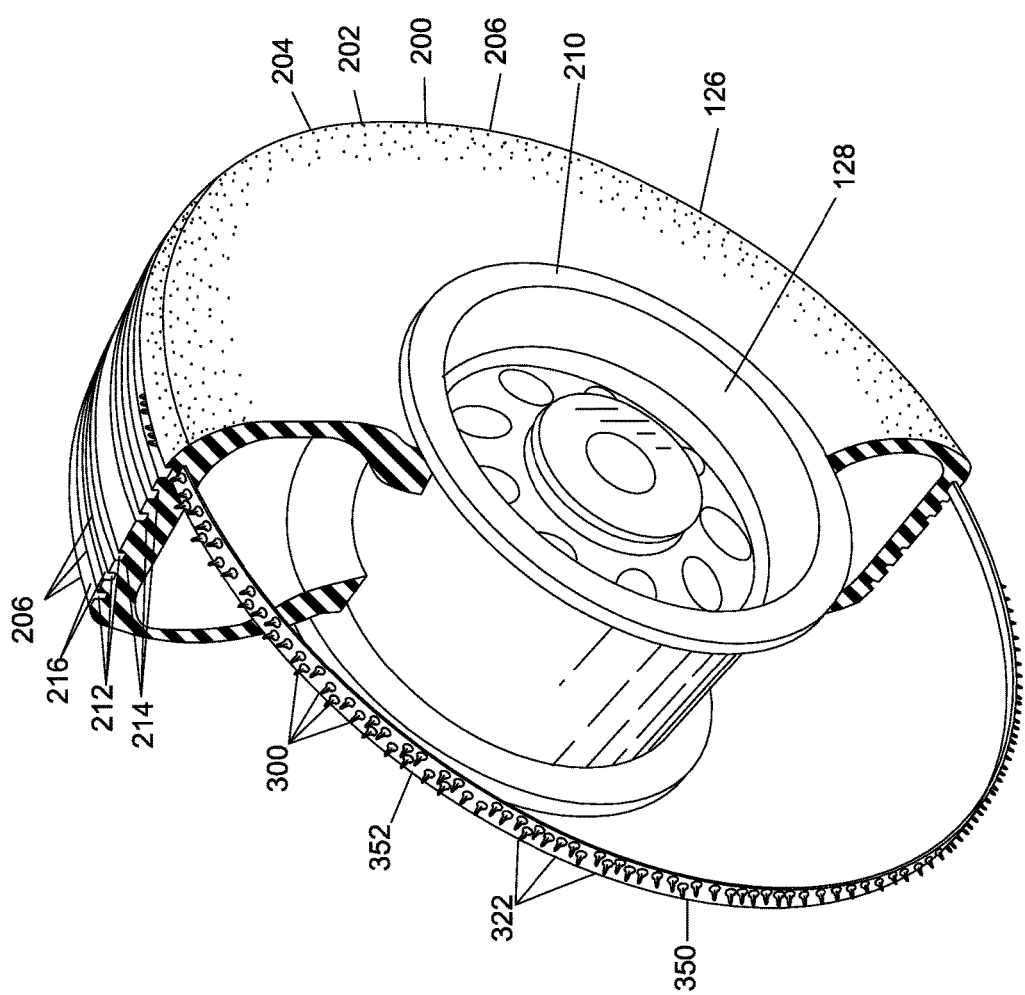
FIG. 9 is a perspective view of a further embodiment of a tire having a stud band extending circumferentially around the tire.

FIG. 9 shows an embodiment of a tire 200 having at least one stud band 350 extending around the tire 200. The stud band 350 may comprise an annular base band 352 that may extend around a circumference of the tread band 204 and which may have a plurality of studs 300 coupled to the base band 352. The studs 300 may be coupled to the base band 352 such as by welding and/or mechanically fastening each stud 300 to the base band 352. Alternatively, the studs 300 may be integrally formed with the base band 352. For example, the base band 352 may be formed of metallic material such as aluminum, steel, or any other metallic material or alloy. The studs 300 may be cast with the base band 352 to form the stud band 350 as a unitary structure. The base band 352 may also be formed separately from the studs 300 which may be attached to the base band 352 such as by welding, mechanical fastening, or any other fastening means.

The stud band 350 may also be formed of a polymeric material such as a plastic material. For example, the base band 352 and/or the studs 300 may be formed of Nylon™, polycarbonate, or any of the plastic material. The base band 352 and/or the studs 300 may also be formed of fiber-reinforced polymer matrix material such as graphite-epoxy material. In an embodiment, the studs 300 and the base band 352 may be molded from plastic material into a unitary structure. Plastic studs 300 may provide a higher durability and/or a higher durometer than the rubber compound from which the tread band 204 or tire 200 may be formed. In an embodiment, the base band 352 may also be formed of a metallic material and the studs 300 may be formed of a plastic material, or vice versa.

Figure 10:
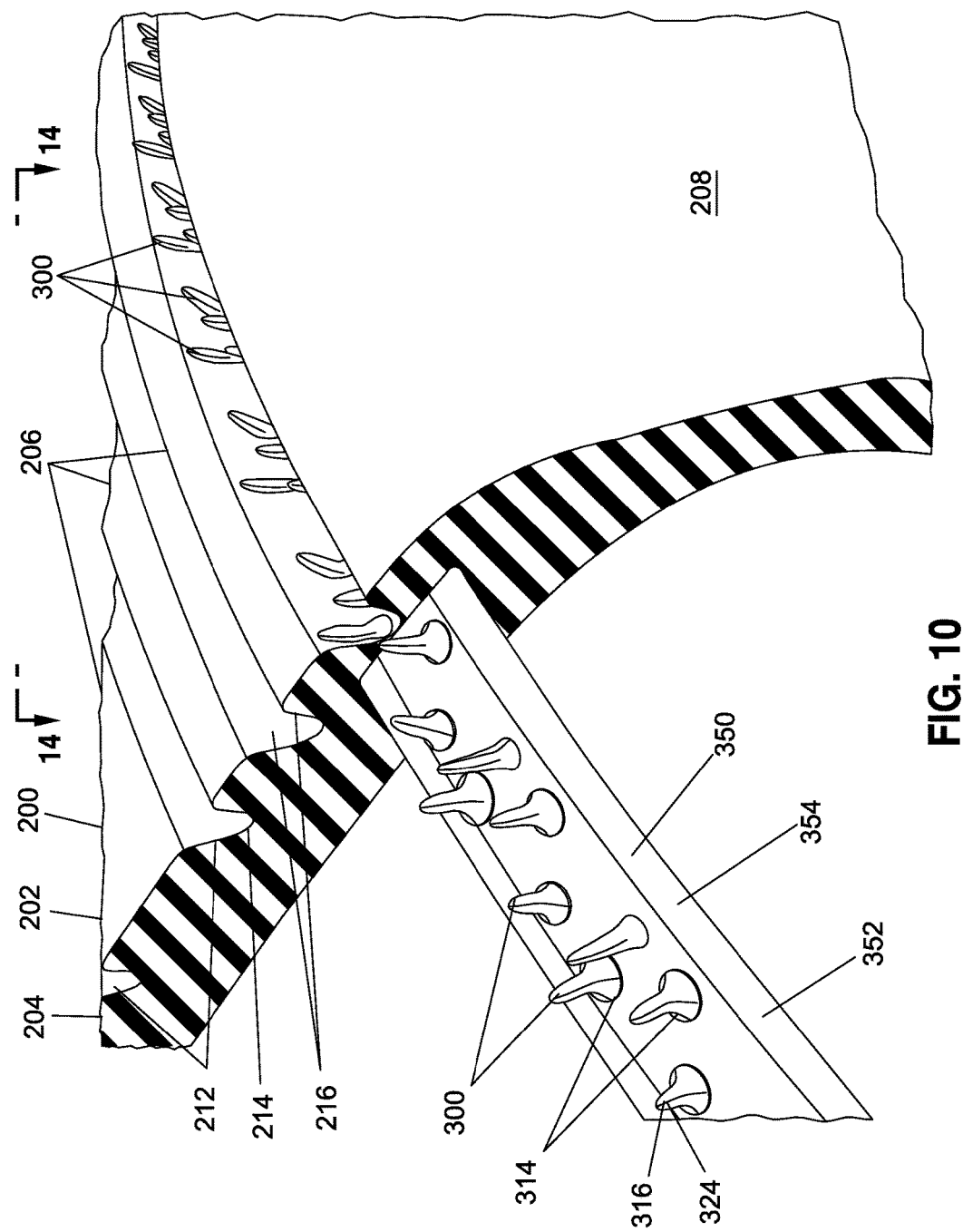
FIG. 10 is a perspective view of a portion of the stud band having a plurality of studs extending upwardly from the stud band.

FIG. 10 shows a portion of a stud band 350 having a plurality of studs 300 extending upwardly from the base band 352 into one of the grooves 212. In an embodiment, the base band 352 may be at least partially embedded in the tread band 204 of the tire 200. For example, the base band 352 may be embedded or encapsulated within the tread band 204 and positioned proximate to or below the groove 212 such as below the groove bottom wall 214 or flush with the groove bottom wall 214. The studs 300 may protrude upwardly through the groove bottom wall 214 and/or groove side walls 216 and may extend into the groove 212. The stud band 350 may advantageously limit tire growth at high rotational speeds such as at the end of a takeoff roll and/or during initial contact of the tires 200 with the runway at touchdown during a landing. The limitation on tire growth may minimize mechanical stress on the tire body 202 which may increase the operational life of the tire 200.

Figure 11:
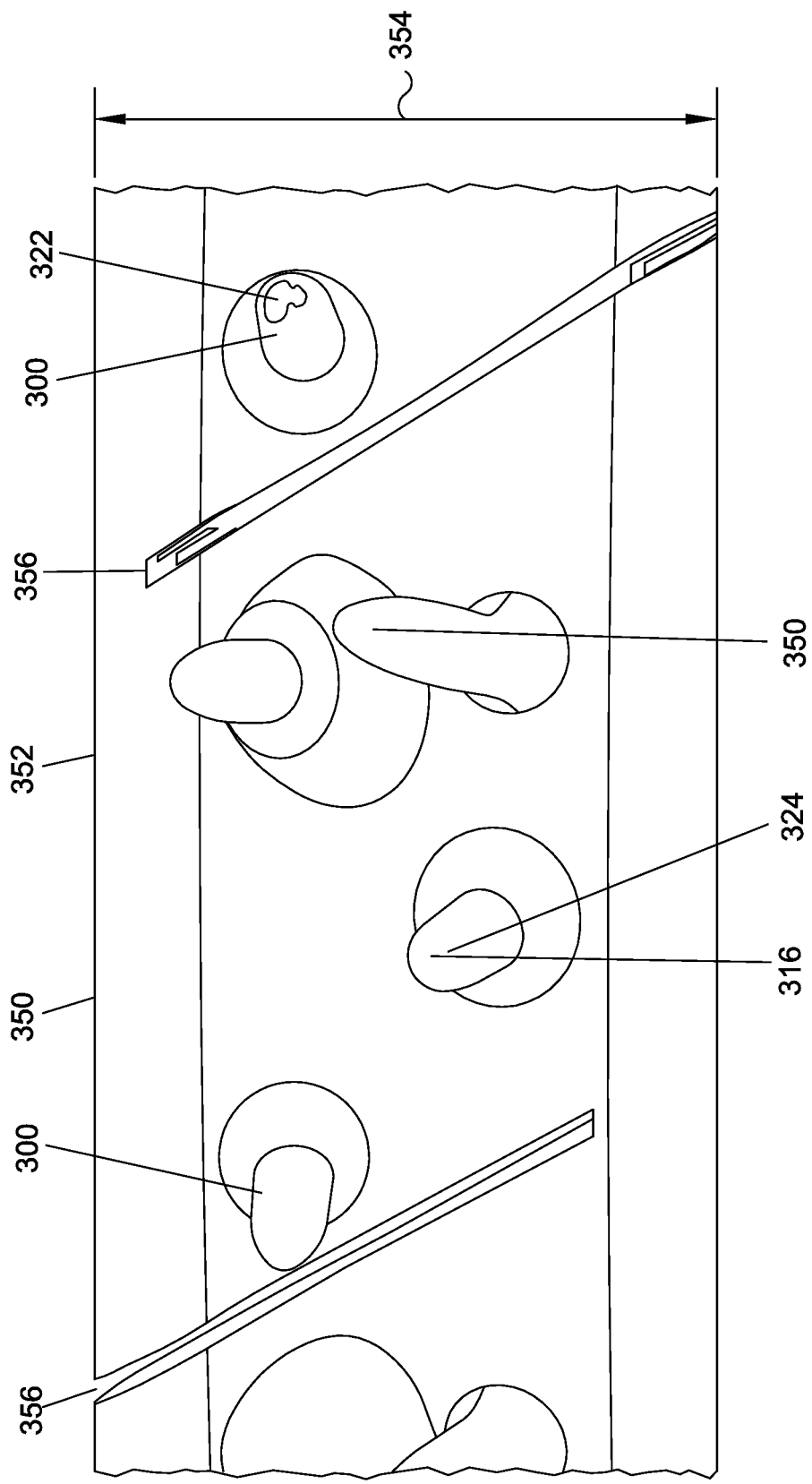
FIG. 11 is a top view of a stud band having a plurality of slits oriented transversely relative to a band width.

FIG. 11 shows a portion of a stud band 350 in an embodiment wherein the base band 352 has a plurality of generally transversely oriented slits 356. The slits 356 may extend at least partially across a band width 354 of the base band 352. The slits 356 may be formed in the base band 352 at spaced intervals around the circumference of the base band 352. For example, the slits 356 may be spaced apart from one another by up to several inches or more along a circumferential direction 220 of the base band 352. The slits 356 may be oriented non-perpendicularly relative to the circumferential direction 220 of the base band 352 as shown. However, the slits 356 may be oriented in any direction including, but not limited to, a perpendicular orientation relative to the circumferential direction 220.

In FIG. 11, the slits 356 may extend partially across the base width to maintain continuity of the circumference of the base band 352. In this regard, each one of the slits 356 may have an opening on one side of the base band 352. The slit 356 openings may alternate from side-to-side of the base band 352 along a circumferential direction 220 of the base band 352. The slits 356 may advantageously increase the flexibility of the base band 352 allowing the base band 352 to flex radially inwardly and outwardly as the contact patch of the tire 200 temporarily deforms as the tire 200 rolls along a vehicle-supporting surface 250.

Figure 12:
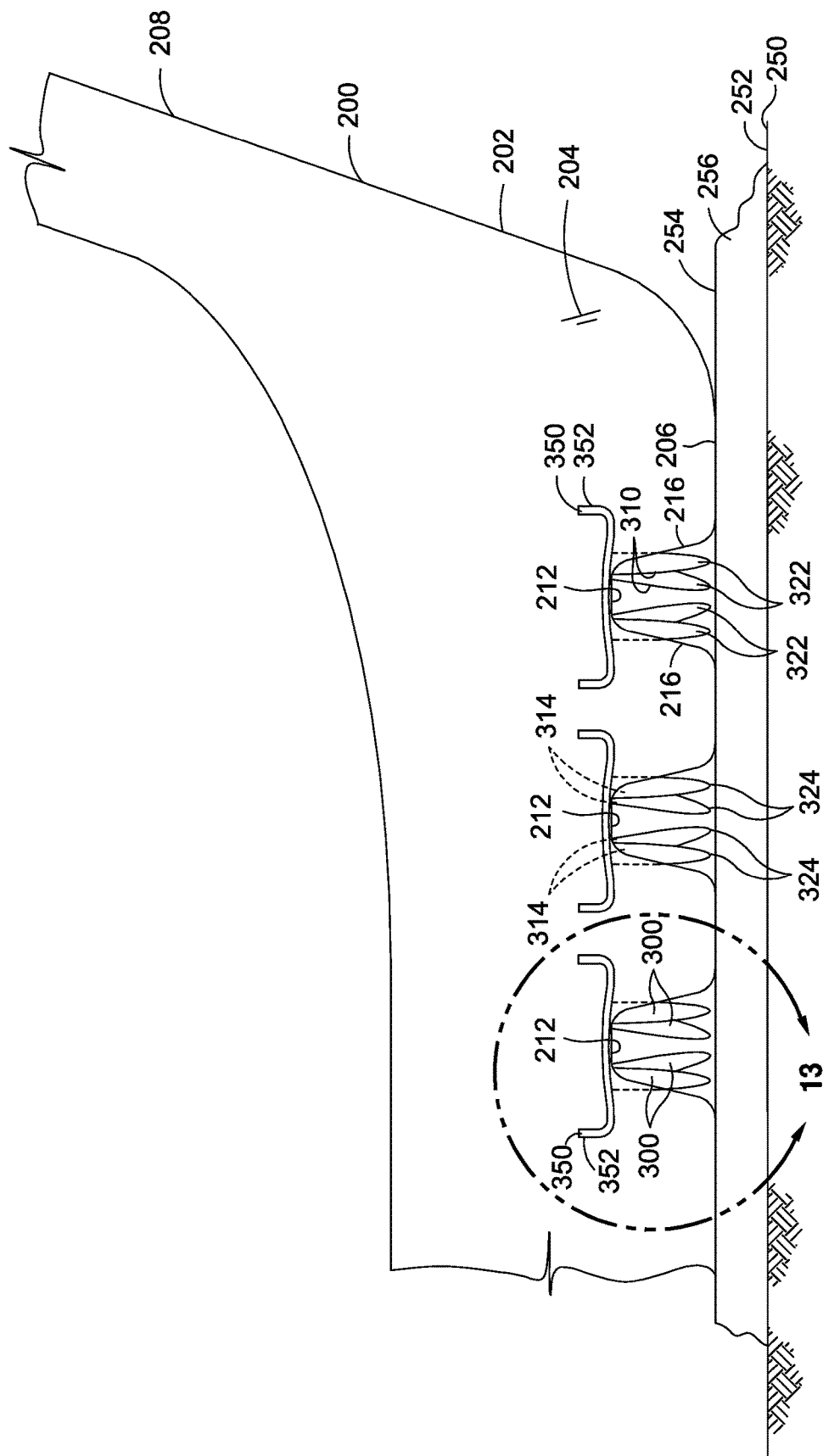
FIG. 12 is a sectional view of a portion of the tire of FIG. 9 supported on a surface.

FIG. 12 is a sectional view of an embodiment of tire 200 of FIG. 9 having a plurality of stud bands 350 embedded within the tire 200. In the embodiment shown, a stud band 350 may be embedded within the tire 200 below the groove bottom wall 214 as indicated above. The studs 300 may be coupled to the base band 352 and may extend upwardly through the groove bottom wall 214 and/or through the groove side walls 216. In the embodiment shown, the studs 300 may have a generally pointed shape 322 although the studs 300 may be provided in any one of a variety of different shapes or configurations as indicated above.

Figure 13:
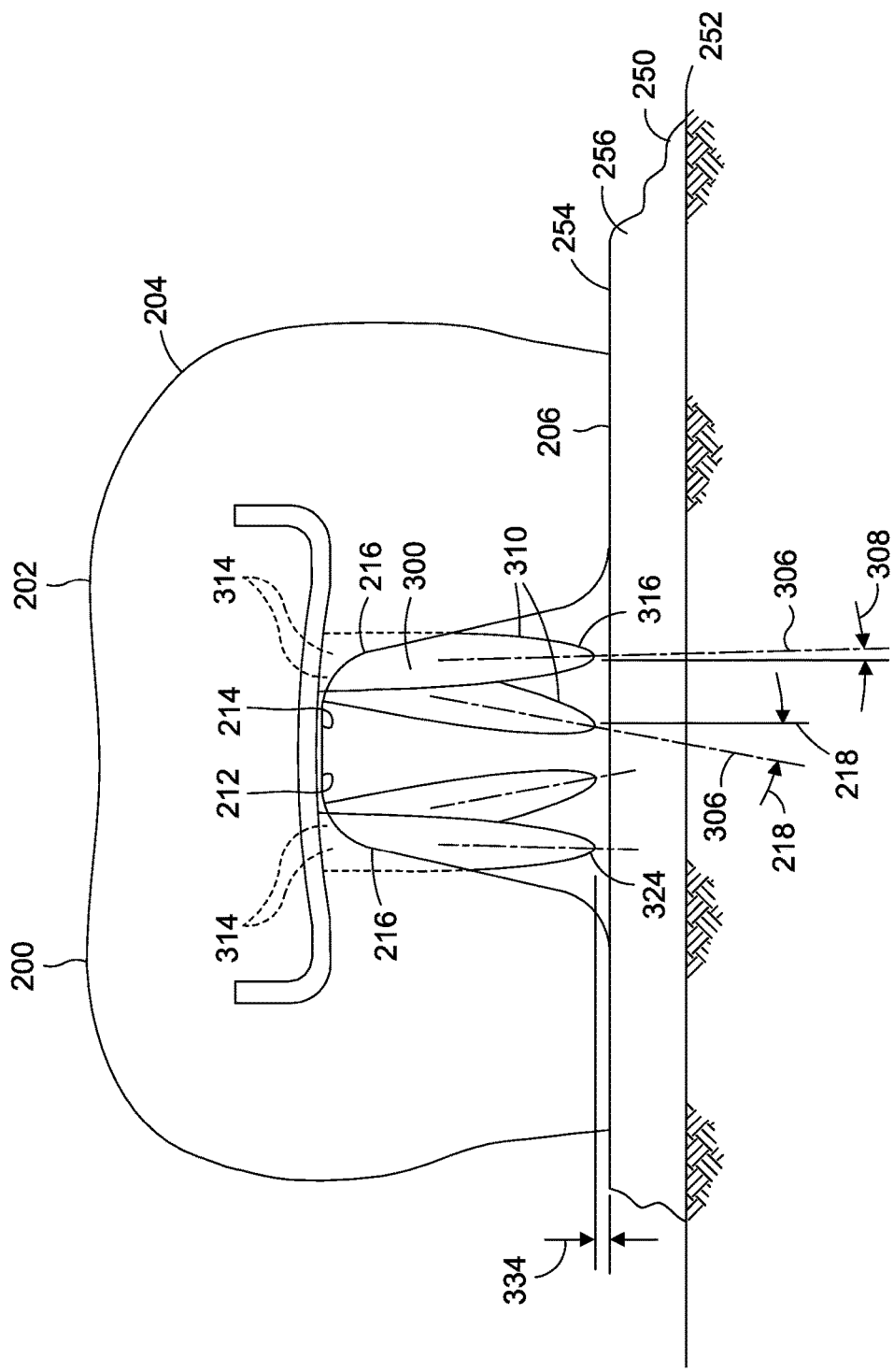
FIG. 13 is a sectional view of a portion of the tire taken along line 13 of FIG. 12 and illustrating the stud tips being recessed below the tread surface.

FIG. 13 is a cross-sectional view of the tire 200 having studs 300 protruding into a groove 212. The base band 352 may be formed of metallic material or plastic material as indicated above. In an embodiment, the base band 352 may be provided in a C-shaped cross section having a center portion and side lips folded upwardly to minimize lateral shifting of the base band 352 within the tire 200. However, the base band 352 may be provided in alternative configurations. For example, the base band 352 may be provided in a generally hollow configuration (not shown) having a circumferential inner wall and a circumferential outer wall defining a hollow band interior and wherein the studs 300 may be coupled to the outer wall. Alternatively, the base band 352 may be provided in a cross-sectional shape that may be generally solid or non-hollow.

In FIG. 13, each one of the studs 300 may have a stud base 314 and a stud tip 316. The stud base 314 may be connected or coupled to the base band 352 using any one of the above-described means. The stud tips 316 may be recessed below the tread surface 206 to avoid the potential for the stud tips 316 damaging a dry runway surface 252, or to avoid the stud tips 316 breaking off and becoming foreign object debris (FOD) as may occur for plastic studs 300 protruding beyond the tread surface 206 and breaking off upon contact with a dry runway or other vehicle-supporting surface 250. In an embodiment, the stud tips 316 may terminate at a tip recession 334 that may be generally flush with the tread surface 206. Alternatively, the stud tips 316 may terminate at a location of up to approximately 0.050 inch or more below the tread surface 206 as indicated above. The studs 300 may have a generally circular cross-sectional shape although the studs 300 may be provided in any cross-sectional shape including an orthogonal cross-sectional shape, and are not limited to a circular cross-sectional shape. In an embodiment, the studs 300 may be provided with a generally pointed tip 324 which may be rounded.

Referring still to FIG. 13, the stud axes 306 of the studs 300 in a groove 212 may be oriented in a non-radial direction 218 when the groove 212 is viewed along a circumferential direction 220. In this regard, each one of the stud axes 306 may define a stud angle 308 relative to a radial direction 218 of the tire 200 when viewed along a circumferential direction 220. In an embodiment, the stud angle 308 of at least two of the studs 300 may be different from one another as shown in FIG. 13. However, the studs 300 in any one of the grooves 212 may be oriented at the same stud angle 308 relative to the radial direction 218.

Figure 14:
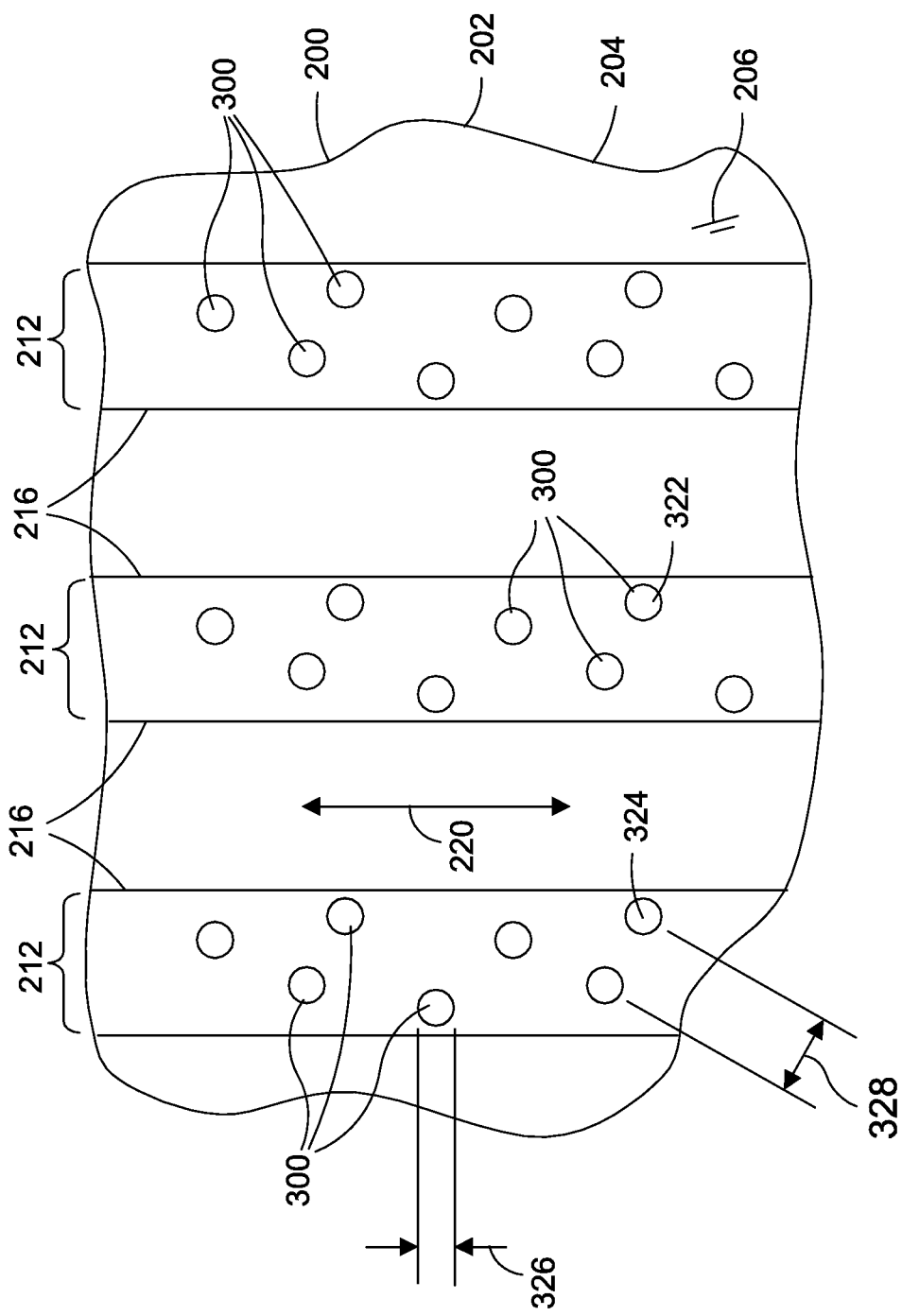
FIG. 14 is a top view of a portion of the tire taken along line 14 of FIG. 10 and illustrating the studs arranged in staggered relation to one another.

FIG. 14 illustrates an arrangement of the studs 300 within the groove 212. In an embodiment, the studs 300 may be arranged in staggered relation to one another. Furthermore, the studs 300 may be positioned at a stud spacing 328 of no greater than approximately one stud width 326 (e.g., one stud 300 diameter). The stud spacing 328 may be selected to allow contamination such as snow, slush, and/or ice to be released from the grooves 212 during rotation of the tire 200. Although FIG. 14 illustrates the studs 300 having a common pattern in each of the grooves 212, different grooves 212 may have different stud 300 patterns as mentioned above.

Figure 15:
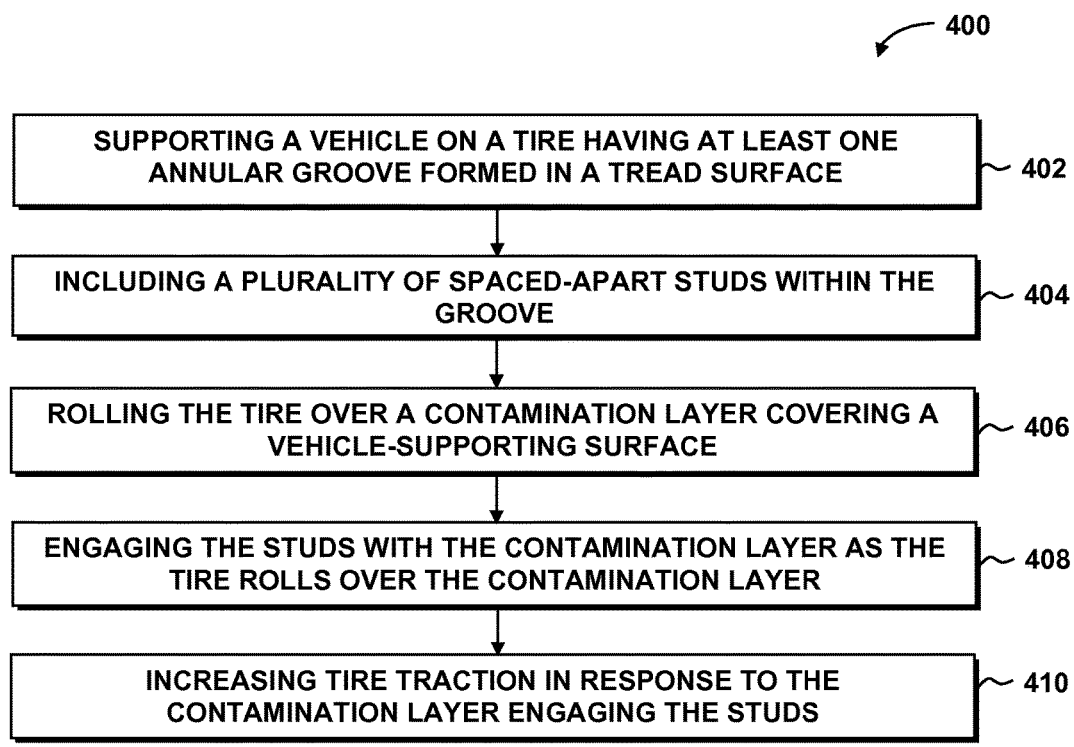
FIG. 15 is an illustration of a flow chart having one or more operations that may be included in a method of increasing traction of a tire with a surface.

FIG. 15 shows a flow chart including one or more operations that may be included in a method 400 of increasing traction of a tire 200. Step 402 of the method may include supporting a vehicle 100 on a tire 200 having at least one annular groove 212 formed in a tread surface 206. For example, FIG. 1 illustrates a commercial aircraft 102 supported on a nose landing gear 120 and a pair of main landing gear 122. The main landing gear 122 may include a plurality of wheels 126 which may be fitted with any one of the tire 200 embodiments disclosed herein. However, as indicated above, the tire 200 embodiments may be fitted to vehicles 100 other than aircraft 102 including, but not limited to, automotive vehicles that may be operated on roadways.

Step 404 of the method 400 of FIG. 15 may comprise including a plurality of spaced-apart studs 300 within the groove 212. The studs 300 may be configured in any one of the above-described embodiments. For example, the studs 300 may be integrally molded into the grooves 212 such as during the molding of the tread band 204 of the tire 200. However, as indicated above, the studs 300 may be attached to the tire 200 using other means. For example, the studs 300 may be individually coupled to the tire 200 by mechanically fastening and/or adhesively bonding each stud 300 to the groove 212. In an embodiment, the studs 300 may be coupled to a base band 352 that may be embedded within the tread band 204 as shown in FIGS. 9-13. The stud tips 316 may terminate at a radial location that may not protrude beyond the tread surface 206. For aircraft operating predominantly or exclusively in snowy conditions, the studs 300 may protrude beyond the tread surface 206 by a tip protrusion 332 distance of from approximately 0.030 inch to approximately 0.10 inch or more.

The studs 300 may be provided in a bladed shape 318 having a bladed tip 320 as shown in FIGS. 3-7. In a further embodiment, the studs 300 may be provided in a pointed shape 322 having a pointed tip 324 as shown in FIGS. 9-13. However, the studs 300 may be provided in any one of a variety of different sizes, shapes, and configurations, and are not limited to the stud 300 configurations shown in the Figures. The method may include spacing the studs 300 at a stud spacing 328 of no less than approximately one stud width 326 to promote the release of contamination from the grooves 212. However, the studs 300 may be arranged at any stud spacing 328 that may promote the release of contamination.

Step 406 of the method 400 of FIG. 15 may include rolling the tire 200 over a contamination layer 254 covering a vehicle-supporting surface 250. For example, the method may include rolling a tire 200 of an aircraft 102 over a snow layer 256 covering a runway surface 252 such as during landing of the aircraft 102. Alternatively, the method may comprise rolling a tire 200 of a motor vehicle (not shown) over a snow layer 256 covering a roadway surface (not shown).

Step 406 of the method 400 of FIG. 15 may include compacting the contamination layer 254 (e.g., snow layer 256) as the tire 200 rolls over the contamination layer 254. Due to the grooves 212 formed in the tread band 204, a portion of the contamination layer 254 may enter the grooves 212 as the tire 200 rolls over the contamination layer 254. The method may include engaging the studs 300 with the contamination layer 254 as the contamination comes into contact with the studs 300 in the grooves 212.

Step 406 of the method 400 of FIG. 15 may include increasing tire 200 traction in response to the contamination layer 254 engaging the studs 300. In this regard, during braking of a wheel 126 (FIG. 1), the contamination layer 254 (e.g., snow) may engage the stud tips 316 and the stud side surfaces 310 of the studs 300 and provide increased resistance to rotation of the tire 200 during braking. The increased resistance of rotation of the tire 200 may be due to the engagement of the snow with the studs 300. Advantageously, because the stud tips 316 may terminate below or flush with the tread surface 206, the braking performance of the tire 200 may not be compromised when the aircraft 102 operates on a dry surface. Furthermore, by confining the studs 300 to within the groove 212, rolling resistance of the tire 200 on dry surfaces is not increased as may otherwise occur for stud tips 316 that protrude beyond the tread surface 206.

Figure 16:
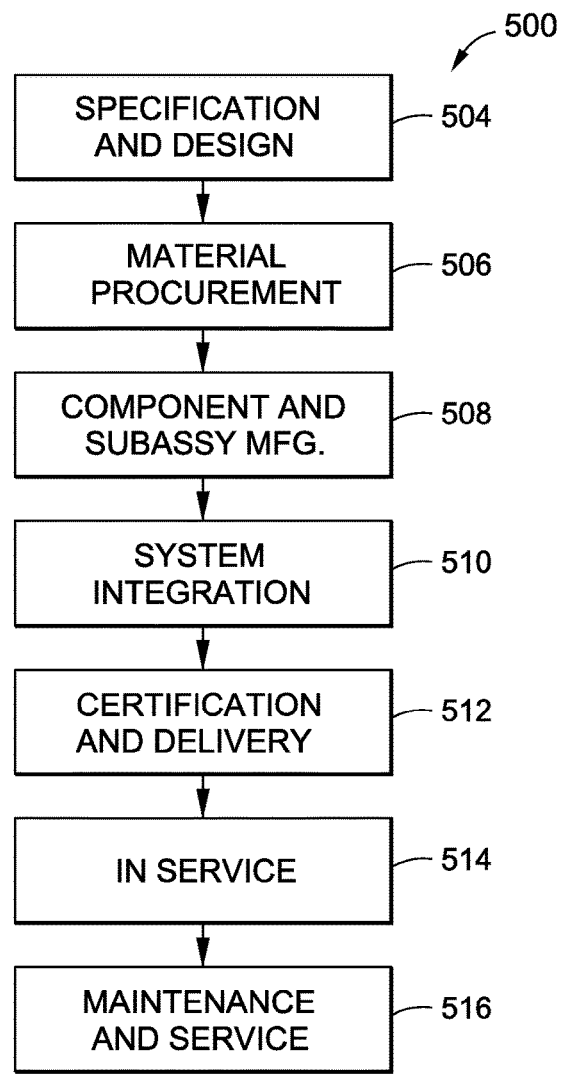
FIG. 16 is a flow diagram of an aircraft manufacturing and service methodology.
Figure 17:
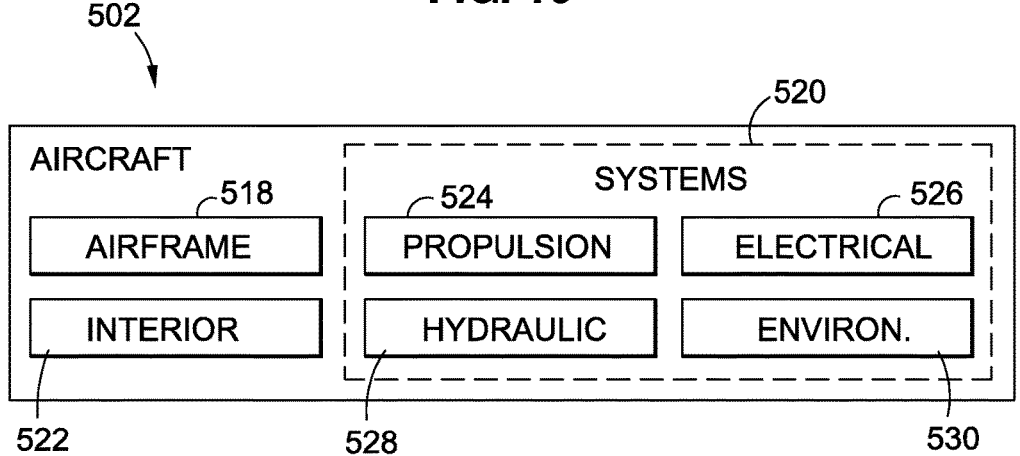
FIG. 17 is a block diagram of an aircraft.

Referring to FIGS. 16-17, embodiments of the disclosure may be described in the context of an aircraft manufacturing and service method 500 as shown in FIG. 16 and an aircraft 502 as shown in FIG. 17. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 17, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the invention may be applied to other industries, such as the automotive industry.

Apparatus and methods embodied herein may be employed during any one or more of the stages of the production and service method 500. For example, components or subassemblies corresponding to production process 508 may be fabricated or manufactured in a manner similar to components or subassemblies produced while the aircraft 502 is in service. Also, one or more apparatus embodiments, method embodiments, or a combination thereof may be utilized during the production stages 508 and 510, for example, by substantially expediting assembly of or reducing the cost of an aircraft 502. Similarly, one or more of apparatus embodiments, method embodiments, or a combination thereof may be utilized while the aircraft 502 is in service, for example and without limitation, to maintenance and service 516.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A tire, comprising:
 a tire body having at least one annular groove formed in a tread surface of the tire body, the annular groove having a groove bottom wall and a first and second groove side wall;
 a plurality of spaced-apart studs located within the groove and arranged along a circumferential direction of the groove in an alternating pattern of major studs and minor studs along each one of the groove side walls, the major studs and minor studs extending radially outwardly from both the groove bottom wall and at least one of the first and second groove side walls and having a stud axis, the major studs extending laterally away from the groove side walls at a lateral protrusion that is greater than the lateral protrusion of the minor studs; and
 the major studs and minor studs having respective stud tips spaced away from the groove side wall, the stud tips each configured as a bladed tip having generally planar stud side surfaces forming an included angle of less than 90 degrees when viewed along the circumferential direction, each stud having one side surface extending from a groove side wall and another side surface extending from a groove bottom wall and defining the stud axis, the stud axes of each stud oriented at a stud angle relative to a radial direction of the tire, the stud angle of each major stud being smaller than the stud angle of each minor stud.

2. The tire of claim 1, wherein:
 the studs are integral with the groove.

3. The tire of claim 1, wherein:
 the stud tips are recessed below the tread surface.

4. The tire of claim 1, wherein:
 the stud tips protrude beyond the tread surface.

5. The tire of claim 1, wherein:
 the studs are spaced apart from one another at a stud spacing of no less than approximately one stud width.

6. An aircraft, comprising:
 a landing gear having a wheel;
 a tire body mounted on the wheel and having at least one annular groove formed in a tread surface of the tire body, the annular groove having a groove bottom wall and a first and second groove side wall;
 a plurality of spaced-apart studs located within the groove and arranged along a circumferential direction of the groove in an alternating pattern of major studs and minor studs along each one of the groove side walls, the major studs and minor studs extending radially outwardly from both the groove bottom wall and at least one of the first and second groove side walls and having a stud axis, the major studs extending laterally away from the groove side walls at a lateral protrusion that is greater than the lateral protrusion of the minor studs; and at least some of the major studs and minor studs having respective stud tips spaced away from the groove side wall, the stud tips each configured as a bladed tip having generally planar stud side surfaces forming an included angle of less than 90 degrees when viewed along the circumferential direction, each stud having one side surface extending from a groove side wall and another side surface extending from a groove bottom wall and defining the stud axis, the stud axes of each stud oriented at a stud angle relative to a radial direction of the tire, the stud angle of each major stud being smaller than the stud angle of each minor stud.

7. A method of increasing tire traction, comprising the steps of:
supporting a vehicle on a tire having at least one annular groove formed in a tread surface, the annular groove having a groove bottom wall and a first and second groove side wall;
including a plurality of spaced-apart studs within the groove, the studs arranged along a circumferential direction of the groove in an alternating pattern of major studs and minor studs along each one of the groove side walls, the major studs and minor studs extending radially outwardly from both the groove bottom wall and at least one of the first and second groove side walls and having a stud axis, the major studs extending laterally away from the groove side walls at a lateral protrusion that is greater than the lateral protrusion of the minor studs; and
at least some of the major studs and minor studs having respective stud tips spaced away from the groove side wall, the stud tips each configured as a bladed tip having generally planar stud side surfaces forming an included angle of less than 90 degrees when viewed along the circumferential direction, each stud having one side surface extending from a groove side wall and another side surface extending from a groove bottom wall and defining the stud axis, the stud axes of each stud oriented at a stud angle relative to a radial direction of the tire, the stud angle of each major stud being smaller than the stud angle of each minor stud.

8. The method of claim 7, further comprising:
rolling the tire over a contamination layer covering a vehicle-supporting surface;
engaging the studs with the contamination layer during the rolling of the tire over the contamination layer; and
increasing tire traction in response to the contamination layer engaging the studs.

9. The method of claim 7, wherein:
the studs are integral with the groove.

10. The method of claim 7, further comprising:
terminating the stud tips of the studs below the tread surface.

11. The method of claim 7, further comprising:
spacing the studs at a stud spacing of no less than approximately one stud width.

12. The method of claim 7, further comprising:
terminating the stud tips of the studs beyond the tread surface.

13. A tire, comprising:
a tire body having at least one annular groove formed in a tread surface of the tire body, the annular groove having a groove side wall;
a plurality of spaced-apart studs located within the groove, at least some of the studs having respective stud tips spaced away from the groove side wall;
an annular base band extending around a circumference of the tire, the base band having a plurality of transversely oriented slits extending at least partially across a band width; and
the studs being coupled to the base band.

14. The tire of claim 13, wherein:
the base band is at least partially embedded in the tire below the groove.

15. The tire of claim 13, wherein:
the studs are formed of at least one of the following: metallic material, plastic material.

16. The tire of claim 13, wherein:
the studs are spaced apart from one another at a stud spacing of no less than approximately one stud width.

17. The tire of claim 13, wherein:
the studs have a pointed shape.

18. A method of increasing tire traction, comprising the steps of:
supporting a vehicle on a tire having at least one annular groove formed in a tread surface, the tire including an annular base band having an axial inner side and an axial outer side and extending around a circumference of the tire and being embedded within a tread band, the base band having a plurality of transversely oriented slits extending at least partially across a band width such that at least one of the slits is open on at least one axial side of the base band; and
including a plurality of spaced-apart studs extending from the groove and coupled to the base band.

19. A tire, comprising:
a tire body having at least one annular groove formed in a tread surface of the tire body, the annular groove having a groove bottom wall and a first and second groove side wall;
a plurality of spaced-apart studs located within the groove and arranged along a circumferential direction of the groove in a pattern of major studs and minor studs, the major studs and minor studs extending radially outwardly from both the groove bottom wall and at least one of the first and second groove side walls and having a stud axis oriented along a generally radial direction, the major studs extending laterally away from the groove side walls at a lateral protrusion that is greater than the lateral protrusion of the minor studs; and
at least some of the major studs and minor studs having respective stud tips spaced away from the groove side wall, the stud tips protruding beyond the tread surface.

* * * * *